United States Patent [19]

Eskeli

[11] 3,879,152

[45] Apr. 22, 1975

[54] TURBINE

[76] Inventor: Michael Eskeli, 6220 Orchid Ln., Dallas, Tex. 75230

[22] Filed: Aug. 7, 1973

[21] Appl. No.: 386,273

Related U.S. Application Data

[63] Continuation-in-part of Ser. No. 185,060, Sept. 30, 1971, Pat. No. 3,758,233.

[52] U.S. Cl. .......................................... 415/80; 415/1

[51] Int. Cl. .................................................. F01d 1/18

[58] Field of Search ..................................... 415/80, 1

[56] References Cited

UNITED STATES PATENTS

| | | | |
|---|---|---|---|
| 715,152 | 12/1902 | Roeske | 415/80 |
| 1,024,363 | 4/1912 | Richardson | 415/80 |
| 1,880,747 | 10/1932 | Bowen | 415/80 |
| 2,596,276 | 5/1952 | Napoli | 415/80 |
| 3,304,051 | 2/1967 | Calhoun | 415/80 |
| 3,708,241 | 1/1973 | Theis et al. | 415/80 |
| 3,733,143 | 5/1973 | Theis, Jr. | 415/80 |

*Primary Examiner*—C. J. Husar

[57] ABSTRACT

A method and apparatus for generation of power in response of a fluid flowing from a higher pressure to a lower pressure in rotating reaction turbine. Said fluid is supplied to said turbine rotor via nozzles in tangential direction forward at a velocity that is normally higher than the local turbine rotor velocity, and then said fluid discharged from said rotor near rotor periphery in backward direction thus generating thrust on said rotor which is then passed through said rotor shaft as the useful power output of the turbine. Fluids used may be gaseous, or liquids, including air and water.

10 Claims, 4 Drawing Figures

14 15 16 13 10 11 12 22 17 18 19 20 21

TURBINE

CROSS REFERENCES TO RELATED APPLICATIONS

This is a continuing-in-part application of patent application titled "Reaction Rotor Turbine," filed Sept. 30, 1971, Ser. No. 185,060, by Michael Eskeli now U.S. Pat. No. 3,758,233.

The principles used with the turbine of this invention were also used in applications "Power Generator with Reaction Rotor," filed Feb. 2, 1973, Ser. No. 330,023; "Turbine," filed Feb. 8, 1973, Ser. No. 330,666; "Pressure Multiplier," filed Mar. 6, 1973, Ser. No. 338,436.

BACKGROUND OF THE INVENTION

This invention relates to power generation devices, and more particularly to turbines employing fluid reaction on the turbine rotor wheel as the power generating means.

The turbine of this invention differs from my earlier invention "Reaction Rotor Turbine," now U.S. Pat. No. 3,758,223, referenced hereinbefore, mainly in the manner that the fluid is introduced to the reaction rotor cavity. To better maintain control of the fluid velocity within the rotor cavity, the fluid is introduced to the rotor cavity via nozzles in the cavity walls where the fluid velocity can be controlled for each exit nozzle if so desired.

DESCRIPTION OF PREFERRED EMBODIMENTS

It is an object of this invention to provide an improved means for generating power by employing a reaction rotor in a turbine, with a tangential fluid feed to the rotor cavity to compel the rotation of said fluid within said rotor cavity preferably at a higher absolute tangential velocity than the local absolute tangential velocity of the rotor; this will then result in an increased fluid pressure near the rotor periphery and thus in increased exit velocity for the fluid from said rotor with imroved power output.

Figure 1:
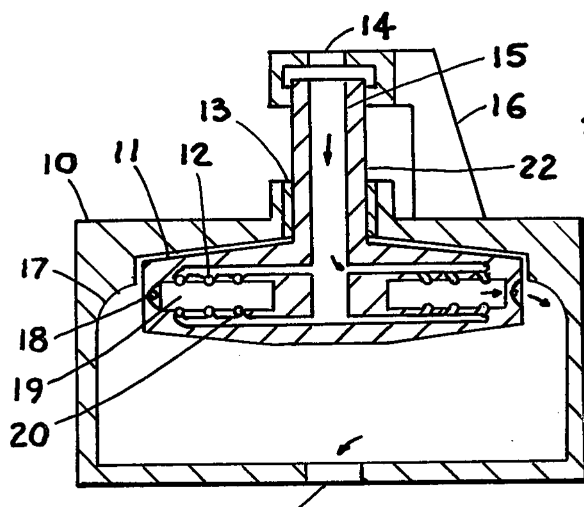
FIG. 1 is a cross section of one form of the device.

Referring to FIG. 1, therein is illustrated one form of the turbine, showing interior details of the unit. 10 is casing, 11 is rotor, 12 are fluid feed nozzles into rotor 11 cavity, 13 is rotor shaft bearing, 14 is fluid inlet to rotor shaft fluid passage 15, 16 is support, 17 is fluid deflector, 18 is fluid exit nozzle from rotor, 19 is rotor fluid cavity, 20 is fluid passage built to rotor wall, and communicating with rotor shaft passage 15 and fluid entry 14, 21 is fluid exit from casing 10, and 22 is rotor shaft.

Figure 2:
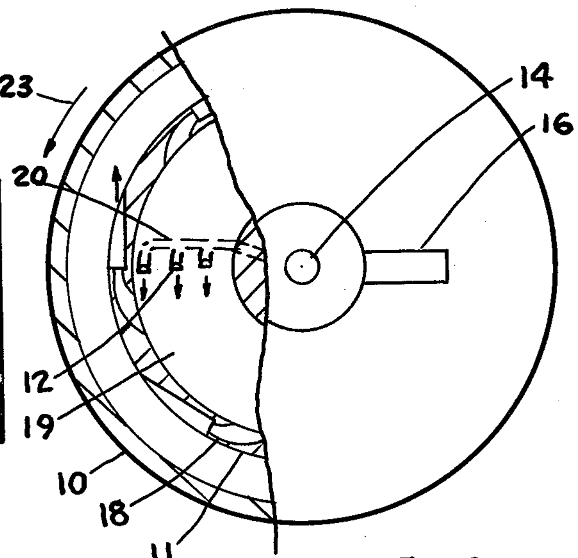
FIG. 2 is an end view of the same unit with a section removed to show interior details.

In FIG. 2, another view of the unit shown in FIG. 1, is illustrated. 10 is casing, 11 is rotor, 18 is rotor fluid exit nozzle, 19 is rotor fluid cavity, 12 is fluid supply nozzle, 20 is fluid passage providing fluid to nozzle 12, 23 is indicator showing direction of rotation of the rotor, 14 is fluid inlet, 16 is support.

Figure 3:
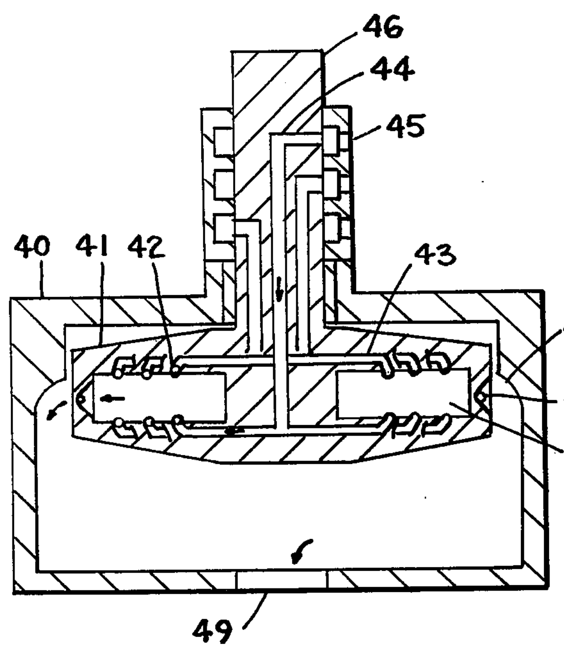
In FIG. 3, a cross section of another form of the device is shown.

In FIG. 3, another form of the turbine is shown, where fluid supply nozzles to rotor cavity are supplied by separate fluid conduits thus allowing close control of the fluid exit velocity from said nozzles into said rotor cavity. 40 is casing, 41 is rotor, 42 is fluid entry nozzle to rotor cavity, 43 is supply duct to nozzle 42, 44 is fluid passage in rotor shaft 46 communicating with supply passage 43, 45 is fluid entry, 47 is fluid deflector, 49 is fluid exit opening, 50 is fluid exit nozzle from rotor 41, 51 is rotor fluid cavity.

Figure 4:
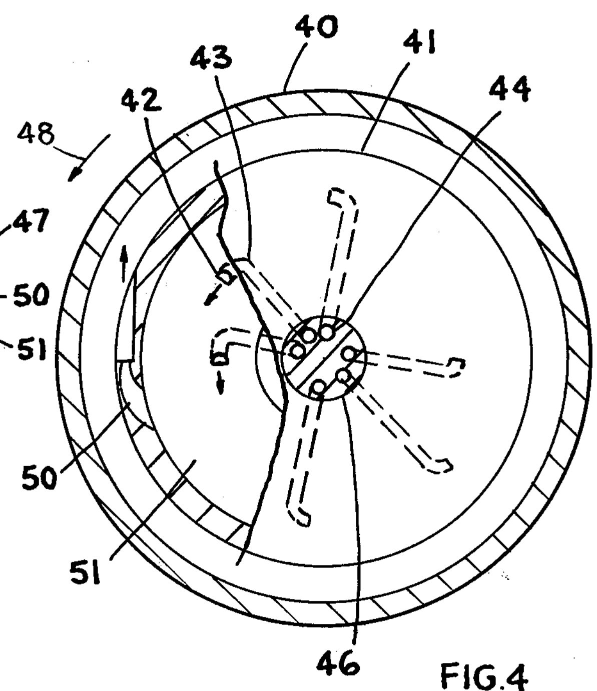
FIG. 4 is a section of FIG. 3, taken to illustrate the rotor and its interior.

In FIG. 4, another view of the unit shown in FIG. 3, is illustrated. 40 is casing, 41 is rotor, 42 is fluid entry nozzle to rotor cavity 51, supplied by passage 43, 44 is shaft fluid passage, 46 is rotor shaft, 50 is rotor fluid exit nozzle, 48 is direction arrow indicating direction of rotation for rotor 40.

In operation, fluid is supplied to rotor through fluid passages located via rotor shaft and rotor walls, and through nozzles located in rotor walls discharging forward to the direction of rotation. Said fluid is pressurized within said rotor cavity due to it being forced to travel along a curved path, with higher pressure occurring near rotor periphery. This high pressure fluid is then discharged from the rotor through exit nozzles located near the rotor perphery; said discharge being backward away from the direction of rotation, thus said fluid will produce thrust on said rotor and produce torque on said rotor. This torque is then passed to said rotor shaft and to an external load as the useful power output of the turbine.

The absolute tangential velocity of the fluid entering the said rotor cavity is normally as high or higher than the absolute tangential velocity of the rotor in the area where the said fluid enters said rotor cavity. Normally, the tangential velocity of the fluid and the rotor are the same in the area near the rotor exit nozzles, such as nozzles 50 in FIG. 4; however, said velocity may also be different, as desired. In FIG. 2, the nozzles 12 are all supplied from a single fluid source; to effect differences in the fluid exit velocity from entry nozzles 12, suitable flow control devices may be provided in said nozzles or in their connecting fluid passages. Alternately, the velocity from all of the nozzles 12, may be allowed to vary; this variation is due to the partial pressurization of the fluid by centrifugal force due to rotation of the rotor. In FIG. 3 and FIG. 4, these entry nozzles 42 are fed separately from outside, and the exit velocities for the fluid from said entry nozzles 42 can be thus closely controlled by varying the fluid supply pressure. Usually, all the nozzles the same radial distance away from center of rotation, for the unit of FIG. 3, are provided with same pressure fluid; as shown in FIG. 3, three sets of nozzles are used and three separate fluid sources are used, each at its own pressure. Obviously, more or less sets of nozzles may be used, and also, each nozzle may be provided with a separately controlled fluid supply, if so desired.

Normally, the fluid absolute tangential velocity is greater than the rotor tangential velocity except at the periphery where they are the same. For example, for a fluid that is water, the rotor tangential velocity at periphery may be 100 feet per second, and the fluid tangential velocity at periphery also be 100 feet per second. However, the fluid tangential velocity may be kept at 100 feet per second constant at all points of the rotor cavity by controlled discharge velocity from said fluid entry nozzles; while, as in normal, the rotor wall tangential velocity decreases linearly to zero at the center of rotation. Thus, the fluid pressure at the periphery will be greater than is normally obtained in centrifuges, and this will result in a higher exit velocity for the fluid from the rotor exit nozzles, and in more power output from the unit, when expressed per pound of fluid flowing.

The fluids used with this turbine may be either liquids or gases. Water or air may be used.

The rotor speeds for liquids are normally lower, while for gases, speeds up to the practical limits imposed by strength of various materials may be used. The rotors in the drawings are shown to have heavy material thicknesses near rotor center; this is normally required in rotors intended for high speed rotation. Also, the rotor is shaped like a disc so as to withstand high rotational speeds; other shapes may be used with units where lower operational speeds are employed.

Applications for this turbine include as a power generator in hydraulic dams, also, it can be used as a steam turbine. Further, it can be used in portable applications, such as a power generator for vehicles or for ships. Further, the fluid supply to the turbine rotor may be from a pump, or a compressor.

Various controls, governors and the like may be used with the turbine of this invention. They do not form a part of this invention and are not further described herein.

The fluid exit nozzles from said rotor are either converging or converging-diverging in shape as required for the fluid to obtain highest attainable fluid exit velocity from said rotor. Usually these fluid exit nozzles are sized and shaped as required to obtain isentropic expansion for said fluid. Fluid inlet nozzles to said rotor may be converging at their entry point to said rotor cavity, or they may be converging-diverging in shape. Usually, these fluid entry nozzles are not intended to accelerate the fluid except in a minor way for flow control purposes; the velocity of the fluid leaving these entry nozzles normally is approximately the same as the fluid velocity in adjoining fluid conduit furnishing said entry nozzles. However, acceleration in said entry nozzles may be provided for some fluids, especially for gaseous fluids.

What is claimed is:

1. A turbine stage for power generation responsive to flow of a fluid therethrough comprising:

a. a reaction rotor for producing said power; said rotor being rotated at a predetermined speed; said rotor having a plurality of reaction discharge passageways disposed near the periphery of said rotor and being oriented to discharge said fluid and generate torque on said rotor responsive to flow of fluid through said discharge passageways; said rotor being hollow and having a first cross sectional area at any radial distance radially exterior of a first fluid feeder nozzle that is greater than a second cross sectional area of said discharge passageways so as to effect a peripheral pressure that is greater than the pressure at the inlet to the rotor immediately downstream of a set of fluid feeder nozzles because said fluid is compressed by passing said fluid along a curved path within a rotating hollow cavity; said rotor having heavy duty construction sufficient to withstand high rotational speeds; said rotor also including a feeding means for feeding said fluid to said rotor cavity; said feeding means being a part of said rotor and rotating with said rotor; said feeding means including i. an inlet port disposed adjacent the center of said compressing centrifuge rotor for entrance of the fluid thereinto;

ii. at least one entry passageway connected with said inlet port for conducting said fluid interiorly of said rotor;

iii. a plurality of fluid feeder nozzles connected with said at least one entry passageway; said fluid feeder nozzles being physically connected with said rotor so as to rotate therewith and impart rotational speed to the entering said fluid, in addition to the flow velocity imparted by differential pressure; said fluid feeder nozzles being oriented and arranged to discharge said fluid forwardly in the direction of rotation of said rotating rotor and being supplied with said fluid at an elevated pressure via said inlet port;

b. a casing support for providing support for said reaction rotor;

c. a shaft journalled in said casing for supporting said reaction rotor; said shaft being connected with said rotor and rotating in unison therewith;

d. bearing means disposed about said shaft for reducing friction; and e. fluid being flowed through said turbine stage from an inlet pressure upstream of said fluid feeder nozzles to discharge pressure downstream of said reaction discharge passageways; said inlet pressure being greater than said discharge pressure; said fluid being flowed from said feeder nozzles at a velocity greater in absolute value than the tangential velocity of said rotor at the same radial distance for effecting a greater power output on said shaft.

2. The turbine stage of claim 1 wherein said fluid feeder nozzles and said fluid pressure are adapted such that the exit velocity of the fluid from said feeder nozzles added to the tangential velocity of the rotor at the same radial spacing thereof has a constant absolute value within said rotor cavity; absolute value being velocity relative to the earth; constant velocity meaning that the combined fluid and rotor velocities are constant such that the absolute velocity of the fluid with respect to the earth is constant across said rotor cavity.

3. The turbine stage of claim 1 wherein the several feeder nozzles have separately pressure controlled fluid entry conduits communicating with outside fluid supply sources.

4. The turbine stage of claim 1 wherein a single fluid supply source is employed for all entry nozzles and wherein each nozzle has means for controlling fluid exit velocity to a predetermined value, relative to rotor.

5. The turbine stage of claim 1 wherein said fluid is a liquid.

6. The turbine stage of claim 1 wherein said fluid is a gas.

7. A method of generating power in a reaction turbine comprising:

a. passing a fluid to a rotating rotor cavity via several fluid entry nozzles at sufficient initial velocity from each nozzle to cause said fluid to rotate within said rotating rotor cavity at an absolute velocity that is greater than said absolute rotor velocity at a predetermined distance from the center of rotation;

b. causing said fluid to flow in arcuate radially outward path with sufficient angular velocity to cause sufficient certrifugal force to pressurize said fluid within said rotor such that the pressure of said fluid at the periphery of said rotor is greater than at the inlet to said rotor shaft entry; and discharging said fluid through reaction nozzles mounted at the periphery of the rotating rotor in a direction that is opposite to the tangential direction of rotation for producing thrust and generating torque on the rotor and its shaft for producing power.

8. The turbine stage of claim 1 wherein said casing sealingly encompasses said rotor and has a discharge aperture for flow therethrough of the fluid discharged from said rotor.

9. The turbine stage of claim 1 wherein said discharge passageways comprise nozzles that are arranged and oriented to discharge said fluid backward in a direction opposite the direction of rotation of said rotor.

10. The turbine stage of claim 1 wherein said plurality of fluid feeder nozzles are disposed at a plurality of staged radial distances from the center of said rotor in order to allow reducing the velocity of said fluid exiting from the fluid feeder nozzle closest to said center of said rotor and still maintain said fluid at a velocity greater than said rotor at radial distances out to said discharge passageways.

* * * * *